Jan. 20, 1953 J. A. RUDHART 2,625,746
ADJUSTABLE INDICATOR HOLDER
Filed Oct. 30, 1946 3 Sheets-Sheet 1
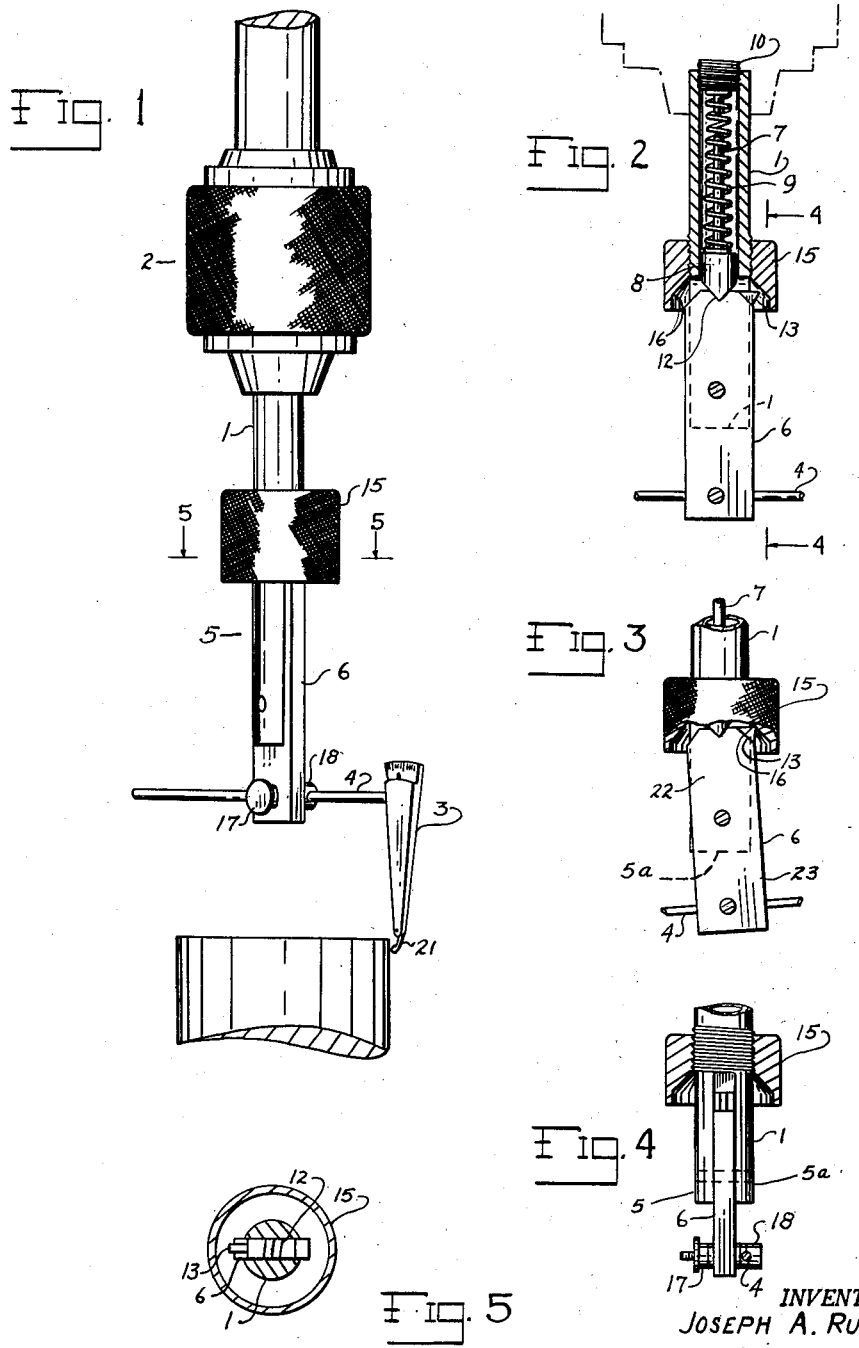
INVENTOR.
JOSEPH A. RUDHART
BY Joshua R. H. Potts
HIS ATTORNEY Jan. 20, 1953  J. A. RUDHART  2,625,746
ADJUSTABLE INDICATOR HOLDER
Filed Oct. 30, 1946  3 Sheets-Sheet 2
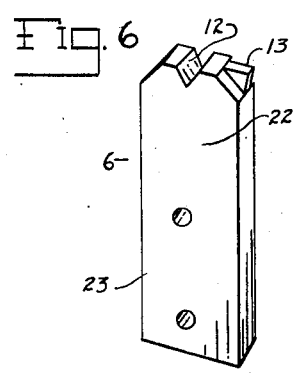
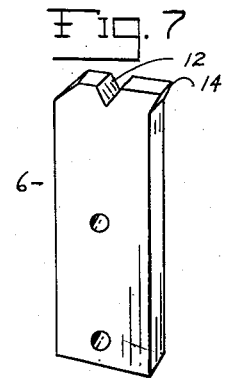
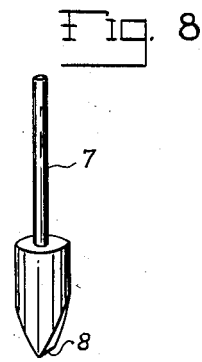
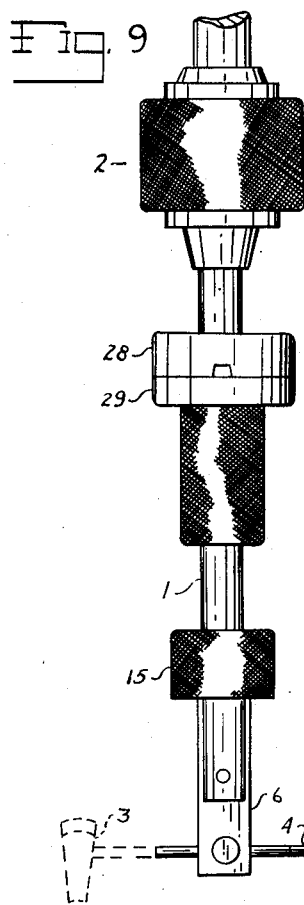
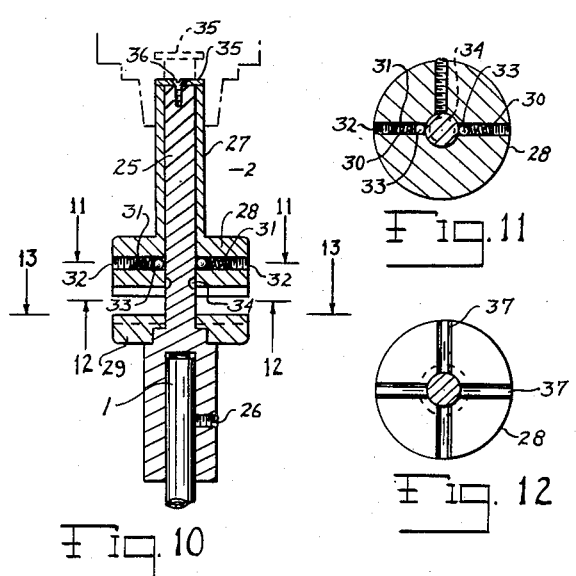
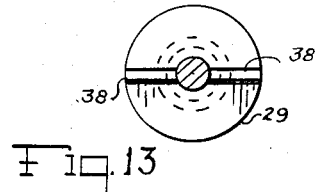
INVENTOR.
JOSEPH A. RUDHART
BY
HIS ATTORNEY Jan. 20, 1953  J. A. RUDHART  2,625,746
ADJUSTABLE INDICATOR HOLDER
Filed Oct. 30, 1946  3 Sheets-Sheet 3
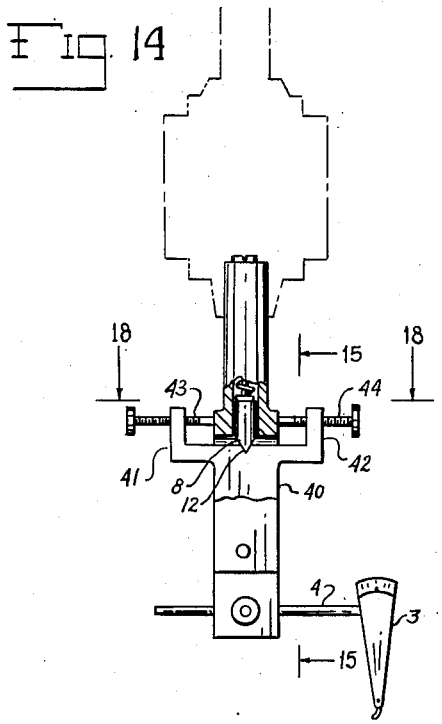
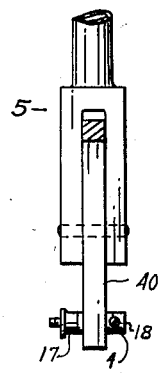
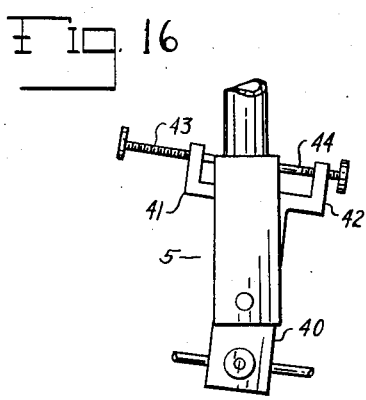
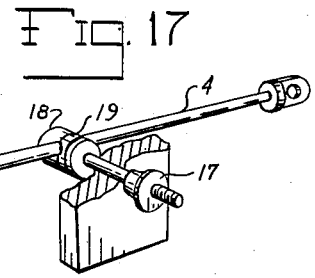
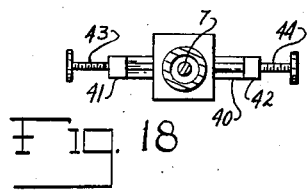
INVENTOR.
JOSEPH A. RUDHART
BY *Joshua R H Potts*
HIS ATTORNEY Patented Jan. 20, 1953

2,625,746

UNITED STATES PATENT OFFICE 2,625,746

ADJUSTABLE INDICATOR HOLDER

Joseph A. Rudhart, Philadelphia, Pa.

Application October 30, 1946, Serial No. 706,547

4 Claims. (Cl. 33—172)

The invention relates to an adjustable holder for an indicator employed particularly as a center finding device in the location of work on a drill press, milling machine, lathe or the like.

The principal object of the invention is the provision of a mounting for holding an indicator in a tool receiving chuck, the mounting being adjustable laterally for obtaining accurate positioning of the indicator, with respect to internal or external indications, in the alignment of the work to be operated upon.

Another object of the invention is the provision of a holder having a micrometer adjustment so that the indicator may be accurately positioned in the alignment of the work with respect to the dead center line of the machine on which the work is secured.

Another object is the provision of a holder for an indicator such as involved herein, which holder is characterized by simplicity of construction, accuracy of adjustment, ease of manipulation, etc., whereby considerable saving is effected in the manufacturing cost of the holder and also in the set-up time for locating the work.

Other objects relating to features of construction, combination of elements and arrangement of parts are either obvious or will manifest themselves as the description proceeds.

For a full and more complete understanding of the invention, reference may be had to the following description and accompanying drawings, wherein:

Figure 1 is a perspective view of my adjustable holder secured in a vertically arranged tool receiving chuck, showing an indicator mounted on the lower extremity of the holder and substantially in working position;

Figure 2 is a vertical sectional elevation of the holder;

Figure 3 is a fragmentary elevation of the holder in a vertical position, showing it in an operative adjustment;

Figure 4 is a vertical section on line 4—4 of Figure 2;

Figure 5 is a horizontal section on line 5—5 of Figure 1, with the plunger removed, and illustrating a plunger seat at an angle;

Figure 6 is an enlarged perspective view of the lever member, showing particularly a bearing projection;

Figure 7 is an enlarged perspective view of a modification of Figure 6;

Figure 8 is a perspective view of a plunger constituting part of the holder assembly;

Figure 9 is a perspective view of an auxiliary attachment for my indicator holder adapting it to work having other than a round contour and showing it in a vertical position;

Figure 10 is a vertical sectional view of the auxiliary attachment;

Figure 11 is a horizontal sectional view taken on line 11—11 of Figure 10;

Figure 12 is a horizontal sectional view taken on line 12—12 of Figure 10;

Figure 13 is a horizontal sectional view taken on line 13—13 of Figure 10;

Figure 14 is a vertical sectional elevation of a modification of the holder construction illustrated in Figure 2;

Figure 15 is an elevation of the holder in vertical position taken on line 15—15 of Figure 14;

Figure 16 is a perspective view showing the modified holder in an adjusted position and substantially vertical;

Figure 17 is a perspective view, partly in section, showing the details of the mounting of an extension bar in substantially a horizontal position; and Figure 18 is a horizontal section on line 18—18 of Figure 14.

Referring particularly to Figures 1 and 2 of the accompanying drawings, it will be noted that my invention comprises essentially a shank 1 having one end fitted into a tool receiving chuck 2, as for example that of a drill press, and the other end supporting an adjustable mechanism for positioning an indicator, said mechanism including a lever assembly designed to support adjustably the indicator for work aligning purposes. More specifically, the lever assembly comprises an indicator 3 suspended by an attaching rod 4 from a lever 6 arranged substantially normal thereto. The lever 6 is pivotally mounted between the arms 5 and 5a which are defined by the slotted construction of the lower end of the shank 1. The arms 5 and 5a form a knuckle joint with the lever 6, the latter being pivoted between the arms 5 and 5a with the pivotal point forming an upper lever arm 22 and a lower lever arm 23.

The upper end of the shank 1 is hollow, and mounted therein is a plunger 7 having a blade 8 formed on its lower extremity and surrounded by a coil spring 9, the ends of which abut against the top of the blade 8, and a screw threaded plug 10 fitted into the internally threaded top portion of the shank. It will be noted that the stem of the plunger does not extend the full length of the hollow portion of the shank, and that to facilitate alignment of the spring 9, the plug 10 has a depending stem which extends toward the stem of the plunger 7 but does not meet it. This arrangement provides a resilient connection between the shank 1 and the lever 6, as will be more fully described presently.

The upper lever arm 22 of the lever 6 is provided with a transverse notch 12 into which the edge of the blade 8 projects. The notch 12 thus provides a seat for the blade 8, and is arranged slightly diagonal or at an angle to the lateral faces of the lever 6, which expedient makes it possible to obtain better leverage for the blade 8 when engaging the notch 12, as will be apparent hereinafter. The upper lever arm 22, which is the upper part of the lever 6, is provided with a projection point or bearing 13 (see Figure 6) formed adjacent and at right angle to the notch 12; Figure 7 shows a projection bearing 14 which is a modification of the bearing 13 illustrated in Figure 6.

A knurled, internally threaded collar 15 engages external threads formed on the lower portion of the shank 1 (see Figure 2 and 4). The collar 15 is provided with a tapered recess 16 which depends over the top of the lever 6 in such a manner as to form a cap or enveloping portion, the conical wall or surface of which may be brought into and out of engagement with the projection bearing 13. Figure 2 illustrates the collar 15 screwed upwardly sufficiently to disengage it from the bearing 13, and in this position it will be noted that the blade 8 is seated within the notch 12, and the lever 6 is held in a depending vertical position. As the collar 15 is screwed downwardly, it engages the projection bearing 13, and when thus brought into engagement, any further downward movement of the collar 15 will cause the lever 6 to pivot, moving the lower lever arm 23, which is the lower part of the lever 6, outwardly. The further the collar 15 is screwed down upon the projection bearing 13, the more pronounced will be the pivoting action of the lever 6, which action in turn is amplified when transmitted to the indicator 3 through the extension rod 4.

By reference to Figures 1 and 4, it will be noted that the effective length of the extension rod 4 may be adjusted by a clamping device comprising a knurled nut 17 adapted to engage the end of a stud 18 extending through an aperture provided in the lower lever arm 23 of the lever 6. Through the provision of washers 19 (see Figure 17) carried on the shank of the stud 18, a lateral adjustment of the indicator 3 with respect to the center line of the tool receiving chuck may be obtained. Likewise, by loosening the nut 17, a lateral adjustment of the rod 4 normal to that provided by the washers 19 may be obtained with respect to the center line. The adjustments just described may be easily and quickly made as a preliminary to truing the work, which adjustments having been coarsely made may be subsequently refined by manipulation of the collar 15, as hereinafter explained.

The indicator 3 may comprise a feeler member 21, which is connected to a pointer designed to move with respect to a scale, the pointer on the scale indicating the alignment of the feeler with respect to the center line of the work.

The operation of my adjustable holder may be described as follows:

The work is first fastened to the bed of the machine on which the device is employed; in the present instance, to the bed of the drill press. The precision set-up may be made directly from following the contour of the work, or with respect to a button secured to the work. For the moment, we may consider the work as being circular in shape (see Figure 1), in which case the feeler 21 of the indicator 3 will indicate the outside measurement of the work as it traces the external contour thereof. In obtaining external contour indications, it is the preferred practice to make the adjustments of the indicator toward the work so that before making the preliminary adjustments described, the collar 15 should be screwed downwardly so as to bring the sloping face of the tapered recess 16 into engagement with the projection 13. This will cause a pivoting action of the lever 6, forcing the lower lever arm 23 to the right of center, as indicated in Figure 3. By having the notch 12 cut at an angle to the transverse axis of the lever 6, which angle may be, for example, approximately ten degrees, the bearing surfaces of the notch 12 offer less resistance to the downward force of the plunger, thereby facilitating the restoration of the lever 6 to the vertical upon the removal of the pressure exerted through the collar 15.

With the feeler 21 thus inclined away from the work, the above-mentioned coarse preliminary adjustments may now be made. Upon the completion of such adjustments, a final micrometer adjustment may now be made by slowly unscrewing the collar 15, which causes it gradually to disengage the projection 13, and under the pressure of the spring 9, the plunger 7 effects the release or restoration of the lever 6. This will cause the lower lever arm 23 to move toward center, and thus bring the feeler 21 into contact with the work.

When the pointer of the indicator 3 is brought to zero position on the scale, the shank 1 is then slowly revolved, thus rotating the feeler member about the perimeter of the work. If the work is found to be out of alignment, a further adjustment of the collar 15 is made, and this adjustment continued until the work has been accurately located with respect to the dead center of the machine. It is obvious that the construction which I provide for the alignment of the work affords a micrometer adjustment in a very simple manner, and avoids any tapping of the free end of the rod 4, which is the customary practice in the manipulation or location of center finding devices.

It will be appreciated by those skilled in the art that in aligning work with respect to a hole therein, internal measurements are made by inserting the feeler 21 within the hole and adjusting the feeler with respect to the internal surface of the hole. Consequently, following the practice of moving the feeler toward the work, the collar 15 should be unscrewed until it disengages the projection 13, at which time the lever 6 will be restored to what may be regarded as its normal position (see Figure 2). It is obvious that as the collar 15 is screwed downwardly, in making the final adjustment, the lower lever arm 23 will gradually be moved to the right of center, which in turn will cause it to approach or move toward the adjacent wall of the hole in the work being aligned. It will, therefore, be seen that the holder herein contemplated includes means for positioning the indicator by providing for internal and external adjustments thereof. It is, therefore, adaptable for the alignment of any sort of work with respect to the center line of a given machine.

For the accurate positioning of work having a non-circular contour, such as square, rectangular, or polygon, the invention contemplates an auxiliary attachment for my indicator mounting (see Figures 9 and 10). This attachment may comprise a shaft 25 having an enlarged lower portion suitably drilled to receive the shank 1. The shank 1 is maintained in position by a set screw 26. The upper end of the shaft 25 extends through a sleeve 27 provided with a flange 28, the face of which opposes the face of a collar 29 having a press fit onto an offset portion of the shaft 25. The flange 28 is provided with radially disposed holes 30 into which are inserted coil springs 31 retained in position by set screws 32. A locking means comprising ball bearings 33, which are located in the bottom of the holes 30 so as to engage a circumferentially formed groove 34 in the shaft 25, are actuated by the springs 31. The shaft 25 may be pulled downwardly to separate the faces of the flange 28, and the collar 29 (see Figure 10). This downward motion is limited by a washer 35 secured to the top end of the shaft 25 by means of a screw 36.

The outer face of the flange 28 is provided with radially disposed grooves 37 adapted to receive complementary shaped, oppositely disposed tongues 38 formed on the face of the collar 29 (see Figures 12 and 13). By complementary tapering the grooves 37 and the tongues 38, their registration with each other is greatly facilitated when the shaft 25 is moved upwardly to bring said grooves and tongues into engagement. The number, and angular disposition of the grooves with respect to the axis of the shaft 25, will depend upon how universal it is desired to make the adjustment of the attachment with respect to the contour of the work. That is to say, my arrangement of the tongues 38 with respect to the grooves 37 is such that they have a positional relation relative to the contour of the work.

It will be understood that when the tongues 38 are disengaged from the grooves 37, effected by the downward movement of the shaft 25, the indicator may be rotated about the work by merely rotating the shaft 25, therefore making it unnecessary to rotate the tool receiving chuck 2 of the machine. This arrangement may prove in many instances to be quite an advantage from the standpoint of convenience in aligning the work, as it will be appreciated that in certain types of machines to which my indicator holder is applicable, the tool receiving chuck may be difficult to rotate on account of the friction offered thereby.

It will be understood that in locating work having a non-circular contour with respect to the center line of the machine, the number of grooves provided will correspond to the number of sides forming the contour of the work; for example, a square piece of work will ordinarily first be aligned with respect to two opposing sides. First, an alignment will be made with respect to one side. Then the shaft 25 will be pulled downwardly and rotated through an angle of one hundred and eighty degrees. This will bring the feeder member into contact with opposing side surfaces, and will result in aligning the work on one axis of the machine. The adjustment having been made with respect to these surfaces, it will be repeated with respect to the third and fourth surfaces, which will mean first turning the pointer ninety degrees, and then one hundred and eighty degrees. It will, therefore, be seen that to accommodate work having four sides; i. e., square or rectangular, four adjustments are made to complete the positioning of the work with respect to dead center.

In the case of a polygon, having five or more surfaces, an adjustment will be required for each surface, and the flange 28 must necessarily be provided with a groove for each surface, said grooves being preferably formed on radii disposed at equal angles. It will be appreciated that in locating the work with respect to each of its surfaces, a micrometer adjustment will be made for each of such surfaces, and the adjustments continued to a point until the work comes within dead center of the machine.

In Figures 14, 15, and 16, I have shown a modification of the lever structure described above. In this modification, the arms 5 have pivoted therebetween a lever 40, which is a modification of the lever 6. It will be noted that the top of the lever 40 terminates in a yoke having fingers 41 and 42 which carry at their extremities adjusting screws 43 and 44 respectively. Figure 14 shows the holder in normal position; i. e., with the lever 40 on the vertical, and the axis thereof coinciding with the center line of the chuck. By turning either of the adjusting screws, 43 or 44, the lever 40 may be tilted off the vertical; as for example, in Figure 16 the lever 40 is shown with the top arm thereof extending to the right of center. This adjustment will move the feeler 21 of the indicator 3 inwardly or toward the work. If an adjustment is desired in the opposite direction, the screw 44 will be loosened and the screw 43 correspondingly tightened until the proper adjustment is obtained, and then both of said screws are tightened in position.

From the foregoing description, it will be seen that the adjustable holder contemplated by my invention will give extremely accurate adjustments in aligning the work with respect to the center line of the machine. This is accomplished primarily by making the indicator adjustable transversely of the center line, and also adjustable laterally thereof, said adjustments being of a preliminary nature and involving a bodily movement of the indicator. By supplementing these coarse or preliminary adjustments with a precision construction, which does not contemplate a bodily movement of the indicator per se with respect to dead center, a micrometer adjustment may be obtained for locating the work.

It will be noted that my holder for mounting the indicator does not involve any spring tension exerted directly on the shank of the mounting construction, which arrangement might introduce accuracies inherent in some prior art devices. It is also obvious that due to the simplicity of my construction and ease of making the various adjustments provided for, a considerable saving in time will be effected.

While certain preferred embodiments of the invention are hereinbefore set forth, it is to be clearly understood that the invention is not to be limited to the exact construction illustrated and described because various modifications of the details may be provided in putting the invention into practice within the purview of the appended claims.

What is claimed is:

1. In an adjustable indicator holder, the combination of a tool receiving chuck, a mounting construction adapted to be supported from said chuck comprising a hollow shank the lower end of said shank being slotted to provide a pair of arms on said shank supporting an adjustable mechanism for positioning an indicator, said mechanism including a lever pivotally mounted between said arms and having a bearing projection, a resilient connection between said shank and said lever including a spring plunger actuated by said spring and reciprocatably mounted within the hollow of said shank, a seat for said plunger formed upon the adjacent end of said lever, a collar in screw threaded engagement with said shank and operatively positioned with respect to said bearing projection, whereby a lateral motion may be imparted to said lever by the manipulation of said collar, and an attaching rod on said lever for supporting an indicator on said lever.

2. In an adjustable indicator holder, the combination of a tool receiving chuck, a mounting construction adapted to be inserted in said chuck comprising a hollow shank, a pair of spaced arms formed upon one end of said shank, a lever pivotally mounted between said arms and having a bearing projection, a micrometer arrangement for effecting the movement of said lever about its pivotal point including a collar threaded on said shank and operatively positioned with respect to said bearing projection, said collar being rotatable relative to said shank to bring said collar into and out of engagement with said bearing projection, means for normally retaining said lever in vertical alignment with the center line of the shank, said aligning means including a spring and a plunger actuated by said spring and reciprocatably mounted within the hollow of said shank, said plunger consisting of a stem terminating at one end in a blade element, a notch obliquely formed in the top end of said lever and adapted to provide a seat for said plunger blade, whereby a resilient connection is effected between said shank and said lever, and an attaching rod on said lever for supporting an indicator, said rod being provided with a lateral and a transverse adjustment with respect to said lever.

3. In an adjustable indicator holder, the combination of a tool receiving chuck, a mounting construction adapted to be secured to said chuck comprising a shank terminating at one end in a pair of spaced arms, a lever pivotally mounted between said arms and projecting beyond the free ends thereof, resilient means for actuating said lever about its pivotal point, an extension bar adjustably mounted upon the projecting end of said lever, an indicator on one end of said bar, said bar being adjustable to provide a preliminary lateral adjustment of said indicator, and a collar threaded on said shank and adapted to engage said lever to move the lever in opposition to said resilient means for making a micrometer adjustment subsequent to obtaining the preliminary adjustment of said indicator with respect to the center line of said chuck.

4. In an adjustable indicator holder, the combination of a tool receiving chuck, a mounting construction adapted to be secured to said chuck comprising a shank terminating at one end in a pair of spaced arms, a lever pivotally mounted between said arms and having a portion projecting beyond the ends thereof, resilient means for actuating said lever about its pivotal point, an extension bar adjustably mounted upon said projecting portion of said lever, said extension bar mounting including an adjustable clamping device providing transverse adjustment of the bar with respect to the center line of said chuck, and a collar threaded on said shank and adapted to engage said lever to move the lever in opposition to said resilient means for making a micrometer adjustment of said indicator.

JOSEPH A. RUDHART.

REFERENCES CITED

The following references are of record in the file of this patent:

UNITED STATES PATENTS

| Number | Name | Date |
|---|---|---|
| 300,533 | Thompson | June 17, 1884 |
| 722,551 | Adamson | Mar. 10, 1903 |
| 725,859 | Moller | Apr. 21, 1903 |
| 734,182 | Kelley | July 21, 1903 |
| 986,445 | Dekle | Mar. 14, 1911 |
| 1,206,668 | Caron | Nov. 28, 1916 |
| 1,285,503 | Waseige | Nov. 19, 1918 |
| 1,341,935 | Schustarich | June 1, 1920 |
| 1,487,119 | Newitt | Mar. 18, 1924 |
| 1,645,948 | Galloway et al. | Oct. 18, 1927 |
| 1,908,470 | Beuttner | May 9, 1933 |
| 1,953,614 | King | Apr. 3, 1934 |
| 1,958,817 | Gase | May 15, 1934 |
| 2,098,838 | Rusnak | Nov. 9, 1937 |
| 2,121,848 | Winters | June 28, 1938 |
| 2,384,058 | Whitmore | Sept. 4, 1945 |
| 2,456,383 | Collins | Dec. 14, 1948 |
| 2,458,753 | Wallace | Jan. 11, 1949 |